United States Patent
Auf Der Maur et al.

(10) Patent No.: US 12,458,055 B2
(45) Date of Patent: Nov. 4, 2025

(54) SERVO KNOCK OUT ASSEMBLY

(71) Applicant: FORMER ASSOCIATES, LLC, Kenosha, WI (US)

(72) Inventors: Thomas Auf Der Maur, Brunnen (CH); Victor Guynn, Romeoville, IL (US); Paul Andres, Grand Rapids, MI (US); Joe Middleton, Burlington, WI (US)

(73) Assignee: FORMER ASSOCIATES, LLC, Kenosha, WI (US)

( * ) Notice: Subject to any disclaimer, the term of this patent is extended or adjusted under 35 U.S.C. 154(b) by 312 days.

(21) Appl. No.: 17/233,612

(22) Filed: Apr. 19, 2021

(65) Prior Publication Data
US 2022/0330602 A1   Oct. 20, 2022

(51) Int. Cl.
*A23P 30/10* (2016.01)
*A22C 7/00* (2006.01)
*F16H 21/50* (2006.01)

(52) U.S. Cl.
CPC ............ *A23P 30/10* (2016.08); *A22C 7/0038* (2013.01); *A22C 7/0084* (2013.01); *F16H 21/50* (2013.01)

(58) Field of Classification Search
CPC ... A22C 7/0038; A22C 7/0084; A22C 7/0023; A22C 7/0076; A23P 30/10; F16H 21/50
See application file for complete search history.

(56) References Cited

U.S. PATENT DOCUMENTS

| | | | | |
|---|---|---|---|---|
| 5,145,454 | A * | 9/1992 | Sandberg | A22C 7/00 53/122 |
| 5,730,650 | A * | 3/1998 | Soper | A22C 7/0084 99/426 |
| 5,924,394 | A * | 7/1999 | Richter | F02D 15/02 123/48 B |
| 7,775,790 | B2 * | 8/2010 | Lindee | A22C 7/0038 425/572 |
| 8,753,107 | B2 * | 6/2014 | Lindee | B29C 37/0003 425/572 |
| 10,765,139 | B2 | 9/2020 | Petrovic | |
| 2005/0103207 | A1 * | 5/2005 | Hansen | A23P 30/10 99/353 |
| 2010/0209575 | A1 * | 8/2010 | Moore | A22C 7/0038 425/444 |
| 2012/0045535 | A1 * | 2/2012 | Lindee | A22C 7/0084 425/436 R |
| 2016/0213010 | A1 * | 7/2016 | Petrovic | A23P 30/10 |
| 2016/0213055 | A1 * | 7/2016 | Petrovic | A23P 30/10 |
| 2016/0255846 | A1 * | 9/2016 | Lindee | A22C 7/0084 |

* cited by examiner

*Primary Examiner* — Susan D Leong
*Assistant Examiner* — Jonathan B Woo
(74) *Attorney, Agent, or Firm* — Sughrue Mion, PLLC (57) ABSTRACT

Systems and methods for a food processing are provided. A food processing knockout assembly includes: a motor; a crank arm connected to the motor and configured to be rotated by the motor, around an axis that passes through the crank arm; a connecting arm connected to the crank arm and configured to move in a vertical direction in response to rotation of the crank arm; a beam connected to the connecting arm and configured to move in the vertical direction in response to movement of the connecting arm in the vertical direction; and at least one knockout shaft connected to the beam, at one end of the at least one knockout shaft, and configured to move in the vertical direction in response to movement of the beam in the vertical direction.

12 Claims, 8 Drawing Sheets

SERVO KNOCK OUT ASSEMBLY

FIELD

Embodiments of the present disclosure are directed to the field of machinery for food processing. More particularly, embodiments of the present disclosure relate to the field of knockout assemblies for use with knockout cups and mold plates in food processing machines.

BACKGROUND

In the related art of preparing processed foods, there are a variety of machines that can be used to turn raw ingredients into processed food products. These processed foods can be of any variety of foods, including meats, vegetables, grains, or combinations thereof.

In particular, food forming machinery can create processed foods by forming the shape of the processed food. In this way, foods such as hamburger patties and chicken patties can be formed from meat. One example of this kind of food forming machinery is the Provisur Formax F-26.

Traditionally, food forming machinery of this type uses hydraulic systems or complex gear drives to control and operate the various components inside the complex machinery. These hydraulic systems or complex gear drives were necessary in order to provide sufficient force to accomplish the various steps that are needed in forming processed foods. In the case of gear drives in the related art, the complex gear drives utilize 90 degree gearboxes to change horizontal rotation of a shaft to vertical movement by ways of cams.

SUMMARY

Embodiments of the present disclosure provide for an electrical servo knockout assembly for driving knockout cups in a food forming machine by using an electrical rotary servo motor.

In embodiments of a food forming machine of the present disclosure, ingredients are processed and the mixture is positioned under the knockout assembly with a mold plate. Upon being positioned under the knockout assembly, the knockout assembly can then knockout the desired shape of the processed food by means of driving knockout cups towards the mold plate. The knockout cups are attached to the knockout assembly, and the knockout assembly can operate to drive the knockout cups into the positioned mixture in order to knock product out of the mold plate.

By using a rotary servo motor, in comparison to linear motors, the knockout assembly of embodiments of the present disclosure may repetitively perform cycles of moving downward to knockout food and moving upward to a return position in a short amount of time.

Embodiments of the present disclosure that include the rotary servo motor, also significantly reduce the number of components as compared to related art knockout assemblies using hydraulic systems, cam systems, or complex gear drives. By reducing the number of wear components such as shafts and cams of complex gear drives, embodiments of the present disclosure can reduce cost by lessening the number of replacement components and increasing the length of time between scheduled maintenance.

Additionally, embodiments of the present disclosure may provide for a more easily accessible design for replacement of components without the need for removal of overhead cams or hydraulics.

According to one or more embodiments, a food processing knockout assembly is provided. The food processing knockout assembly includes: a motor; a crank arm connected to the motor and configured to be rotated by the motor, around an axis that passes through the crank arm; a connecting arm connected to the crank arm and configured to move in a vertical direction in response to rotation of the crank arm; a beam connected to the connecting arm and configured to move in the vertical direction in response to movement of the connecting arm in the vertical direction; and at least one knockout shaft connected to the beam, at one end of the at least one knockout shaft, and configured to move in the vertical direction in response to movement of the beam in the vertical direction.

According to an embodiment, the at least one knockout shaft is configured to repetitively move upward and downward, based on the motor generating rotational motion in a single rotational direction.

According to an embodiment, each of the at least one knockout shaft includes a tube shaft and a pull bar, provided within the tube shaft.

According to an embodiment, another end of the at least one knockout shaft is connected to a spreader bar.

According to an embodiment, the at least one knockout shaft is two knockout shafts that are attached to respective ends of the beam.

According to an embodiment, the food processing knockout assembly further includes a housing that houses the motor, the crank arm, the connecting arm, and the beam, wherein another end of the at least one knockout shaft is configured to protrude out of the housing.

According to an embodiment, the housing includes a base and a cover.

According to an embodiment, the food processing knockout assembly further includes a gearbox connected to the motor, and a coupling that connects the crank arm to the gearbox.

According to an embodiment, the coupling is a keyless bushing.

According to an embodiment, the coupling is a hydraulic keyless bushing.

According to an embodiment, the hydraulic keyless bushing is coupled to a circumferential surface of the crank arm and a circumferential surface of the gearbox.

According to an embodiment, the motor is a rotary servo motor.

According to one or more embodiments, a method of operating a food processing knockout assembly is provided. The method includes: knocking out food product by causing at least one knockout shaft of the food processing knockout assembly to move downward by operating a motor of the food processing knockout assembly; moving the at least one knockout shaft of the food processing knockout assembly upward to a return position by operating the motor. The food processing knockout assembly further includes: a crank arm connected to the motor and configured to be rotated by the motor, around an axis that passes through the crank arm, a connecting arm connected to the crank arm and configured to move in a vertical direction in response to rotation of the crank arm, and a beam connected to the connecting arm and configured to move in the vertical direction in response to movement of the connecting arm in the vertical direction. The at least one knockout shaft is connected to the beam, at one end of the at least one knockout shaft, and configured to move in the vertical direction in response to movement of the beam in the vertical direction.

According to an embodiment, the at least one knockout shaft is configured to repetitively move upward and downward, based on the motor generating rotational motion in a single rotational direction.

According to an embodiment, each of the at least one knockout shaft includes a tube shaft and a pull bar, provided within the tube shaft.

According to an embodiment, another end of the at least one knockout shaft is connected to a spreader bar.

According to an embodiment, the at least one knockout shaft is two knockout shafts that are attached to respective ends of the beam.

According to an embodiment, the food processing knockout assembly further includes a housing that houses the motor, the crank arm, the connecting arm, and the beam, wherein another end of the at least one knockout shaft is configured to protrude out of the housing.

According to an embodiment, the housing includes a base and a cover.

According to an embodiment, the food processing knockout assembly further includes a gearbox connected to the motor, and a coupling that connects the crank arm to the gearbox.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

It will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Although the description describes application to patty or meat formation, it is not restricted to such. Application to other production methods, such as baked goods, requiring knockout may be understood by one of ordinary skill in the art.

Figure 1:
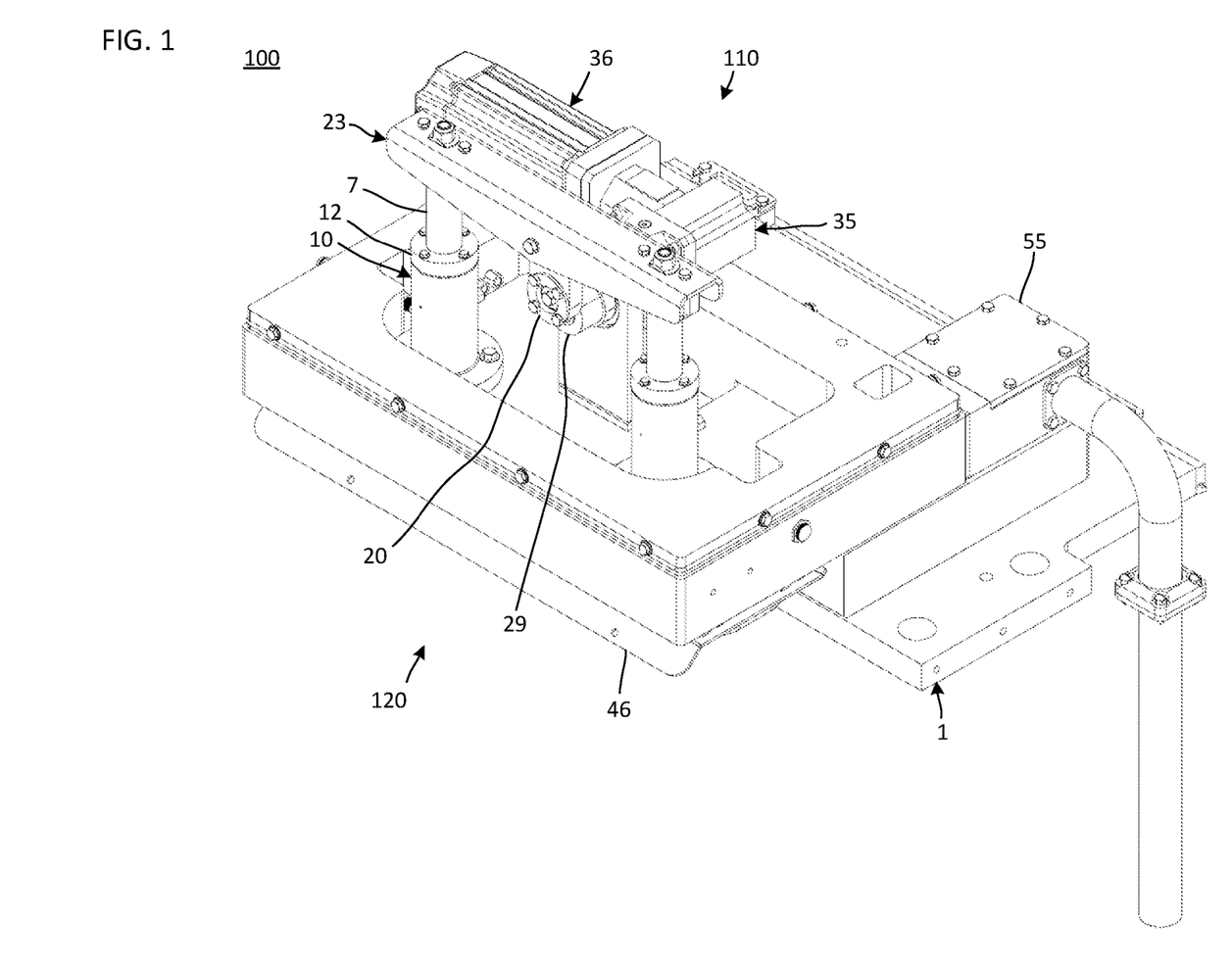
FIG. 1 is a perspective view illustrating a knockout assembly, without a cover, according to an embodiment of the present disclosure.
Figure 2:
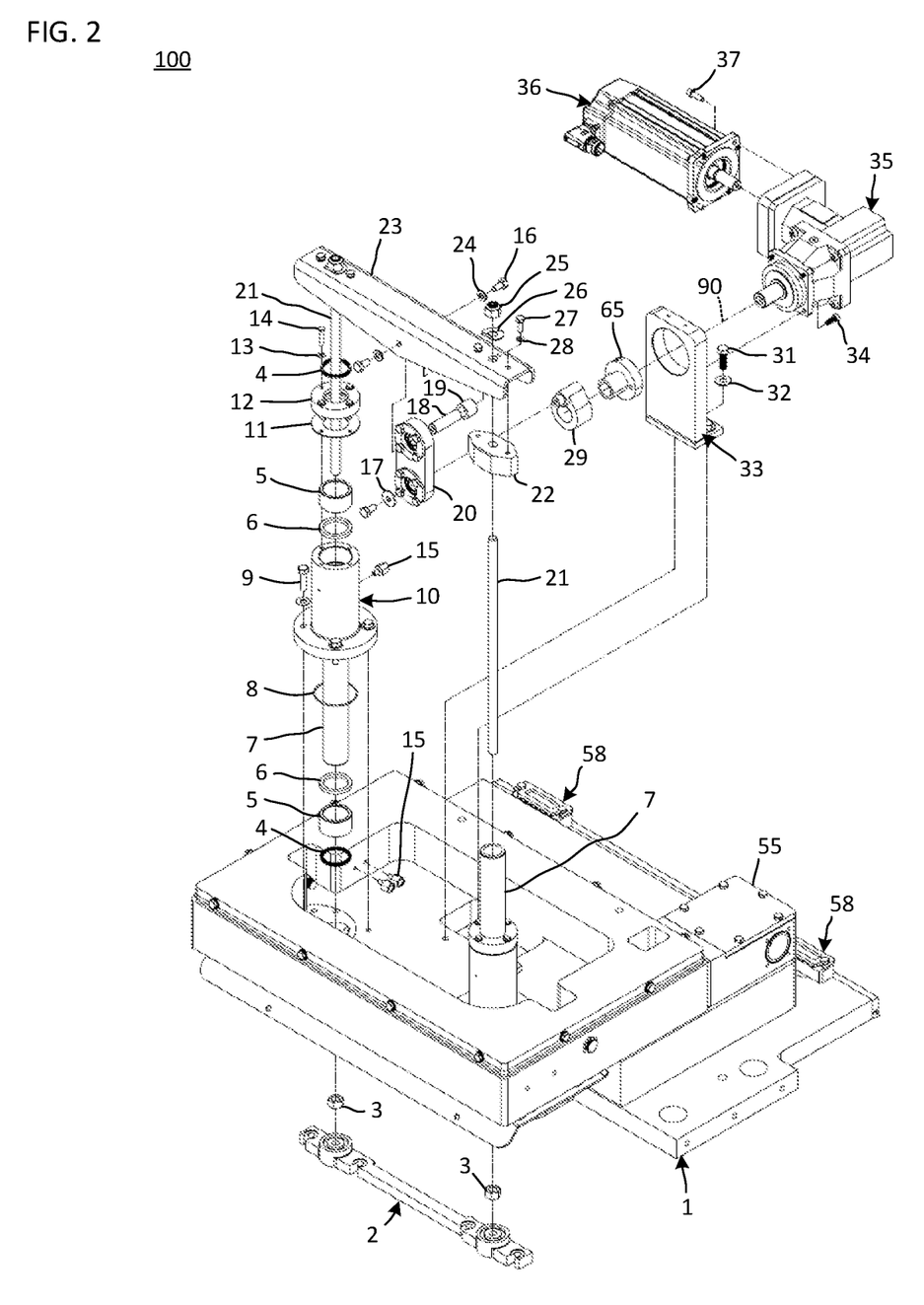
FIG. 2 is an exploded view of the knockout assembly, without the cover, illustrated in FIG. 1.
Figure 3:
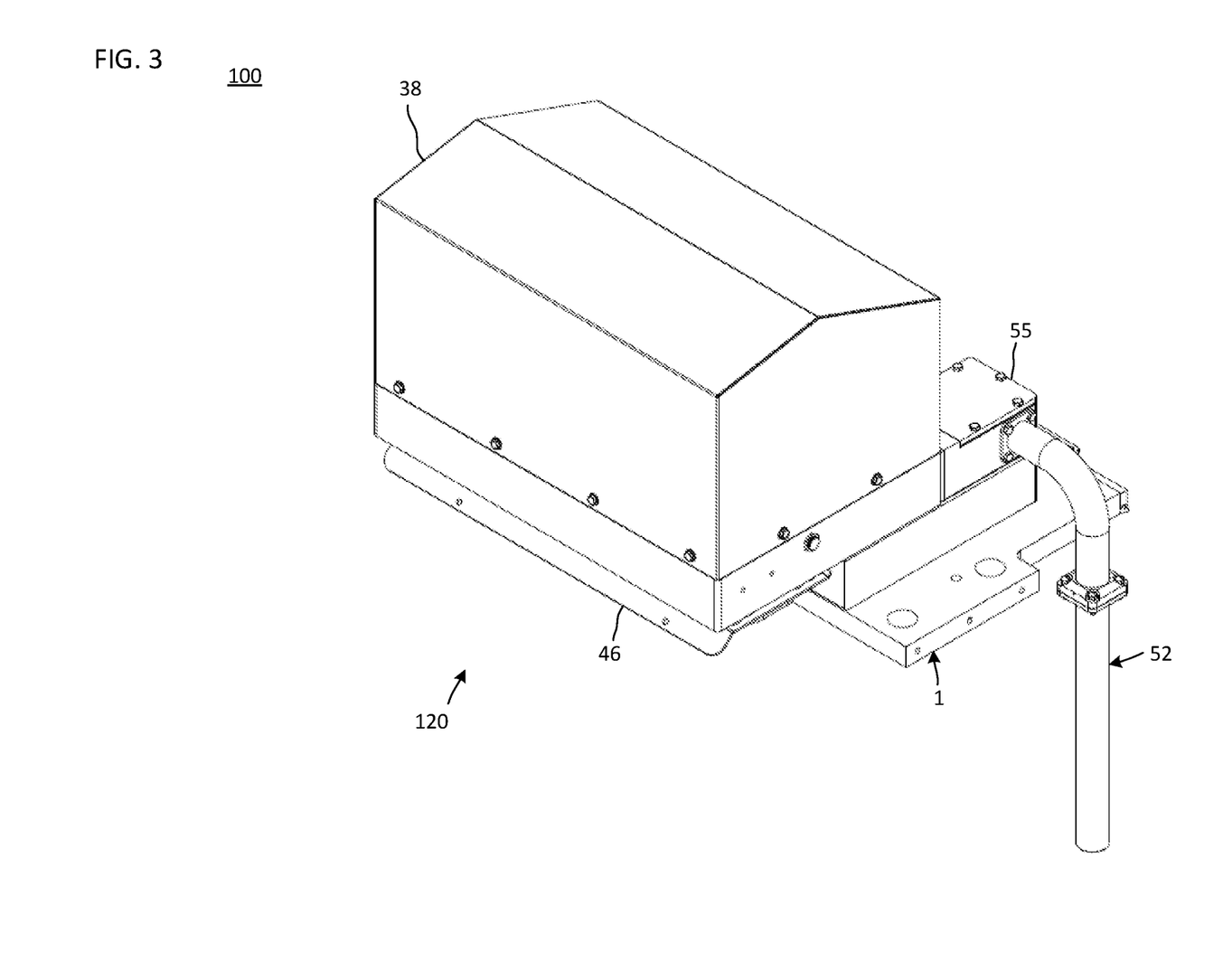
FIG. 3 is a first perspective view of the knockout assembly, with the cover, according to an embodiment of the present disclosure.
Figure 4:
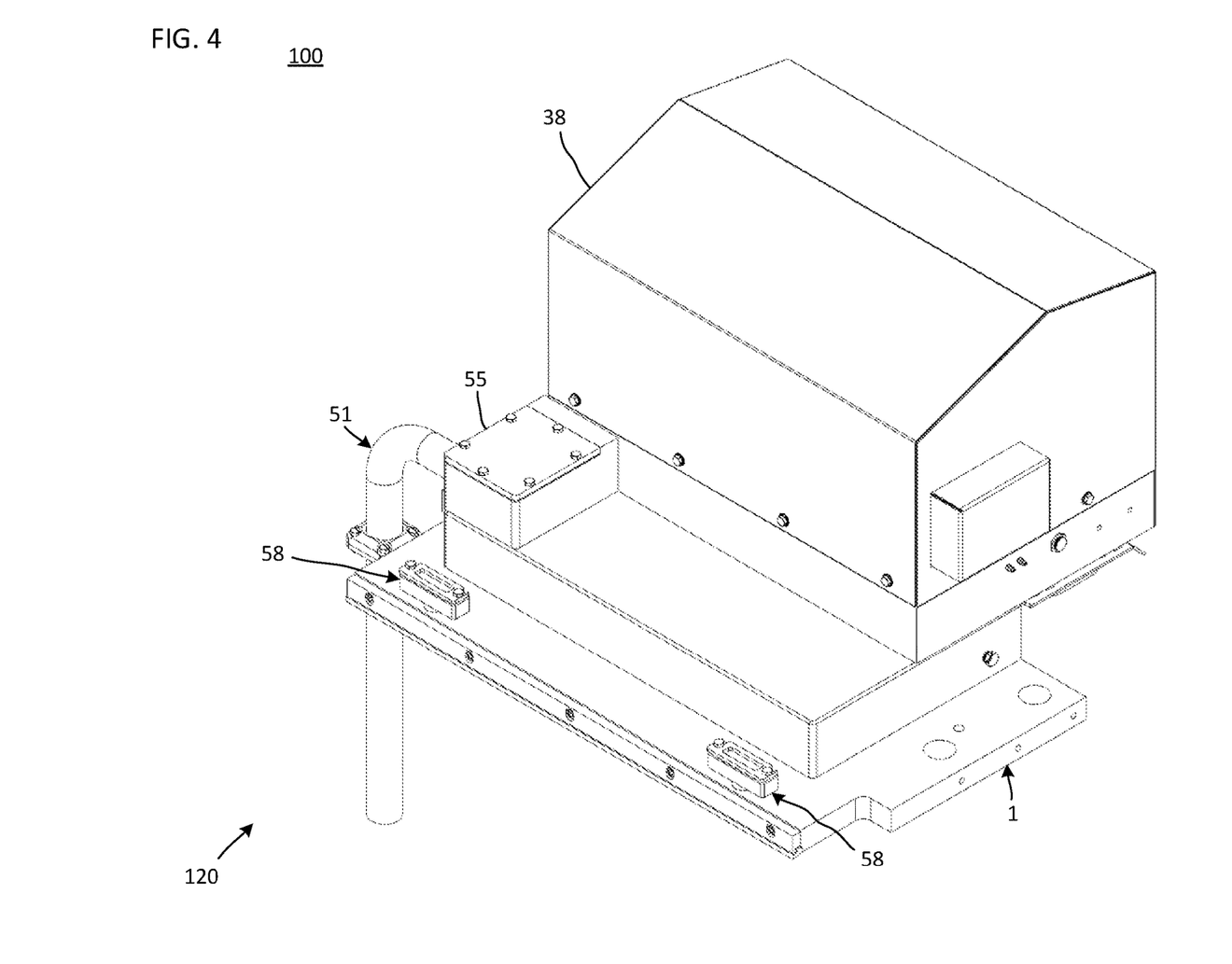
FIG. 4 is a second perspective view of the knockout assembly, with the cover, according to an embodiment of the present disclosure.
Figure 5:
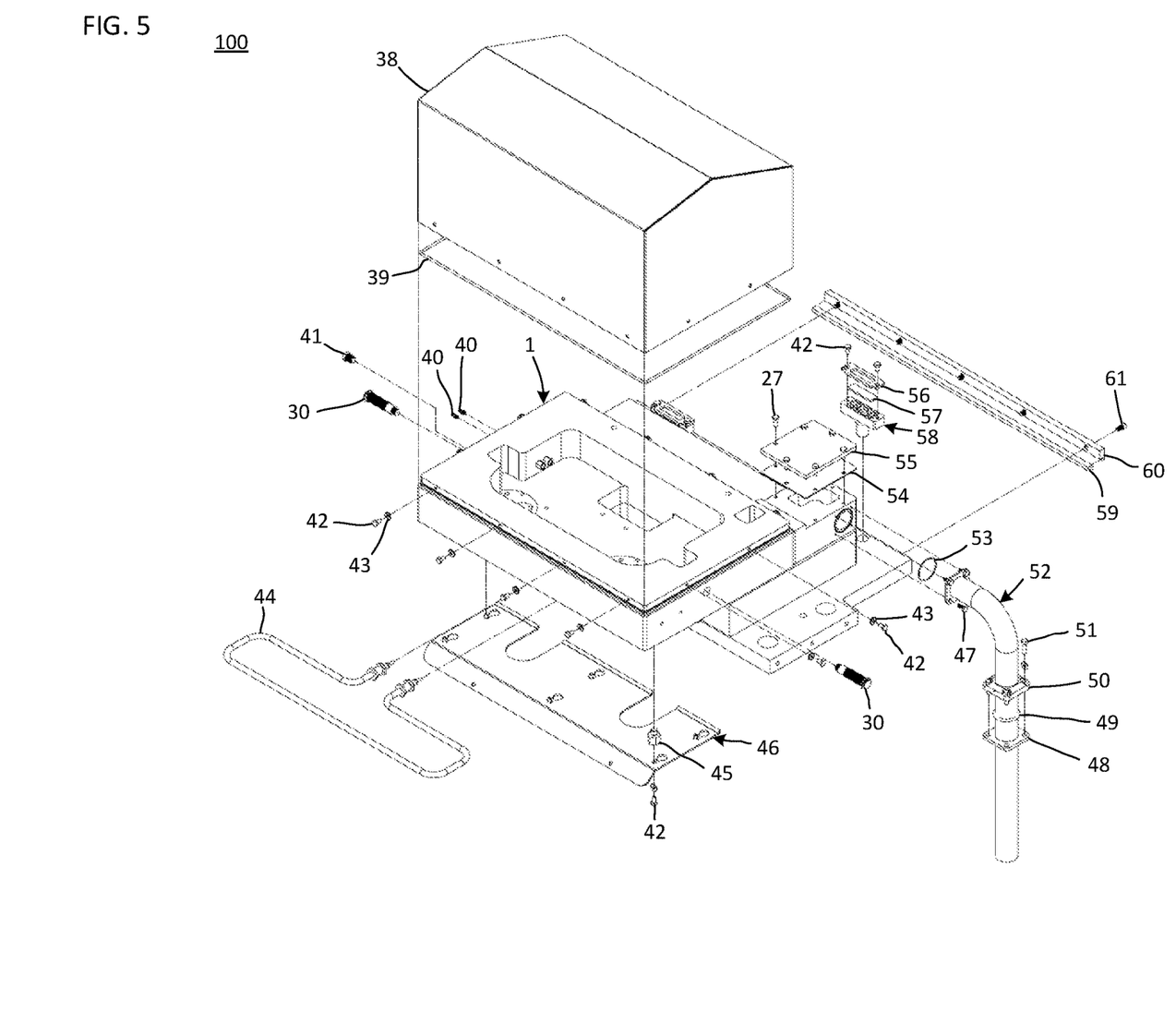
FIG. 5 is an exploded view of the knockout assembly, with the cover, illustrated in FIG. 3.
Figure 6:
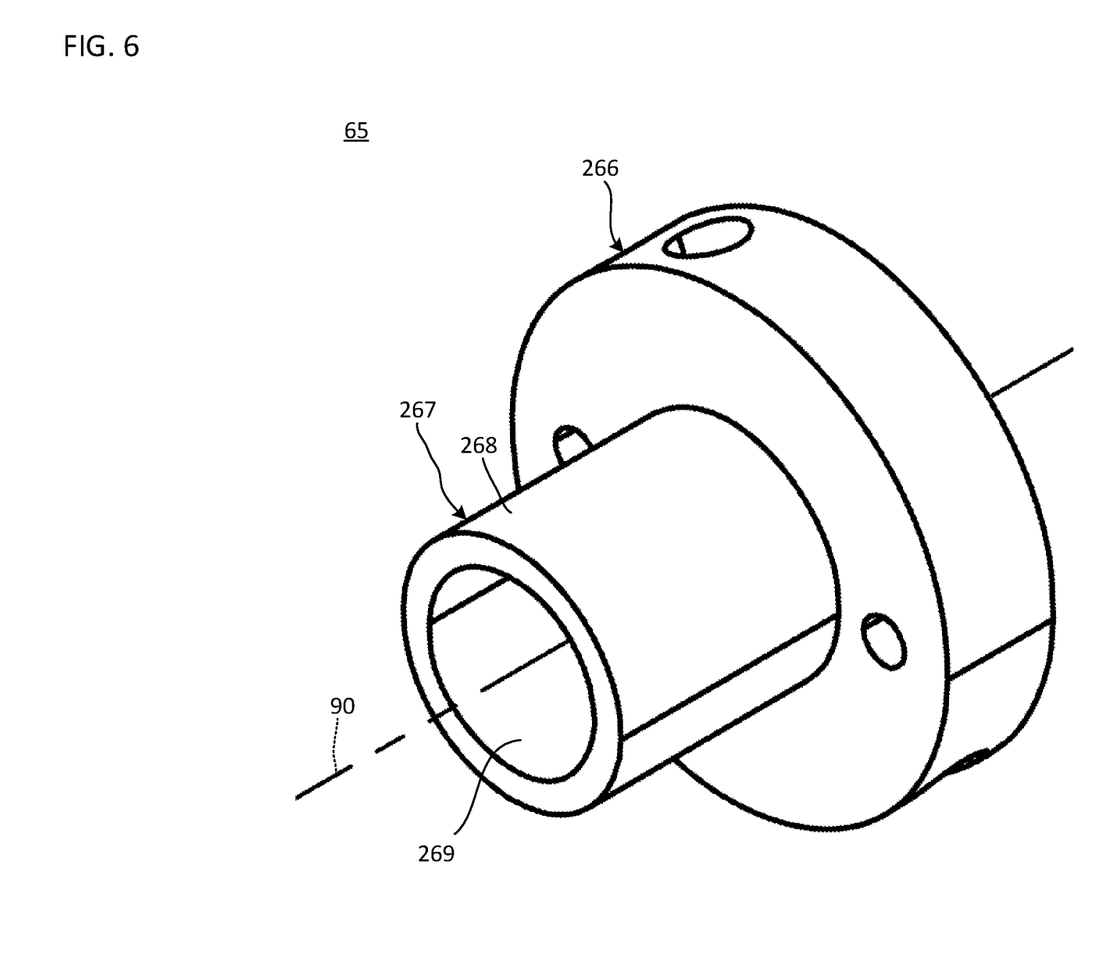
FIG. 6 is a perspective view illustrating a coupling, according to an embodiment of the present disclosure.
Figure 7:
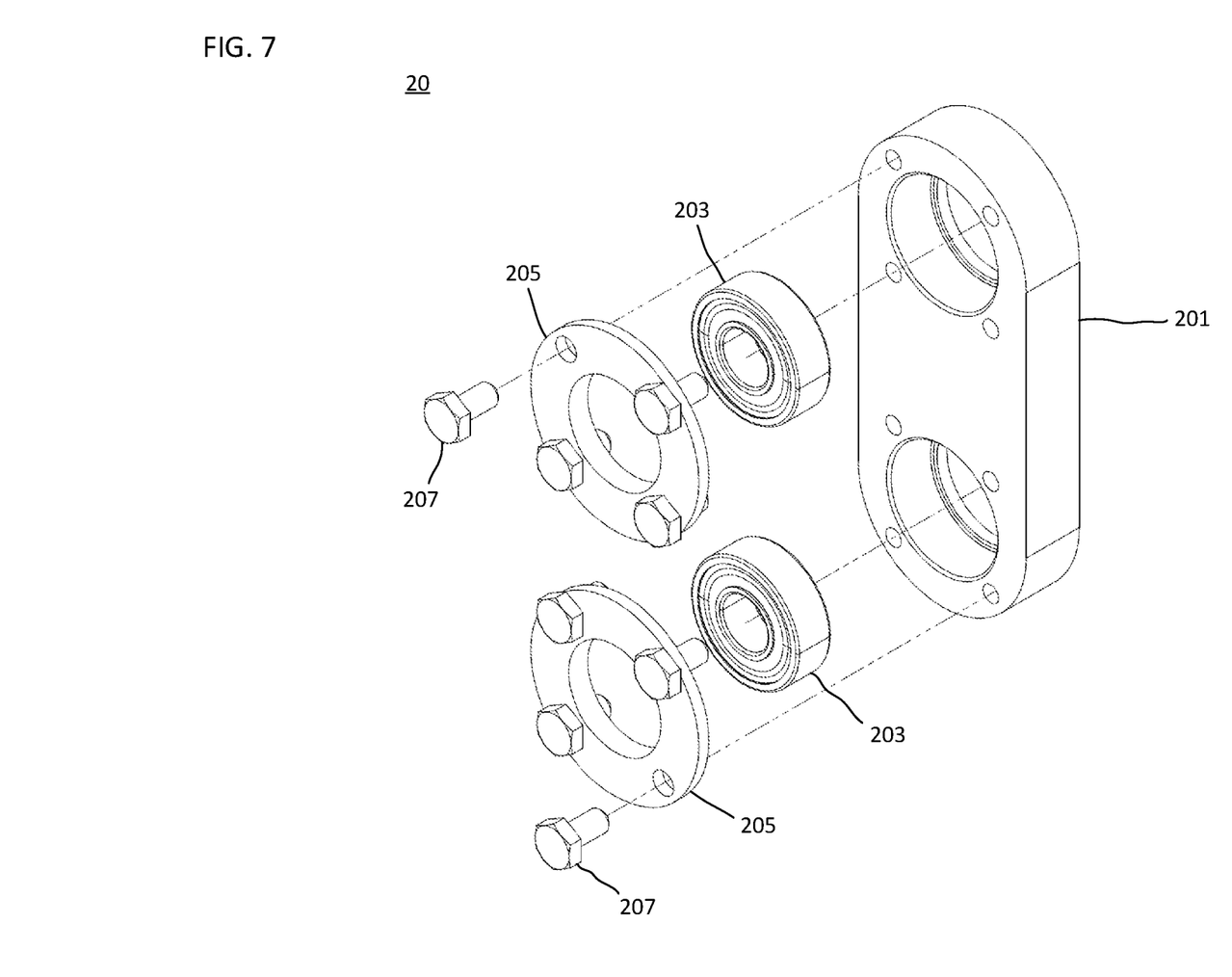
FIG. 7 is a perspective view illustrating a connecting arm assembly according to an embodiment of the present disclosure.
Figure 8:
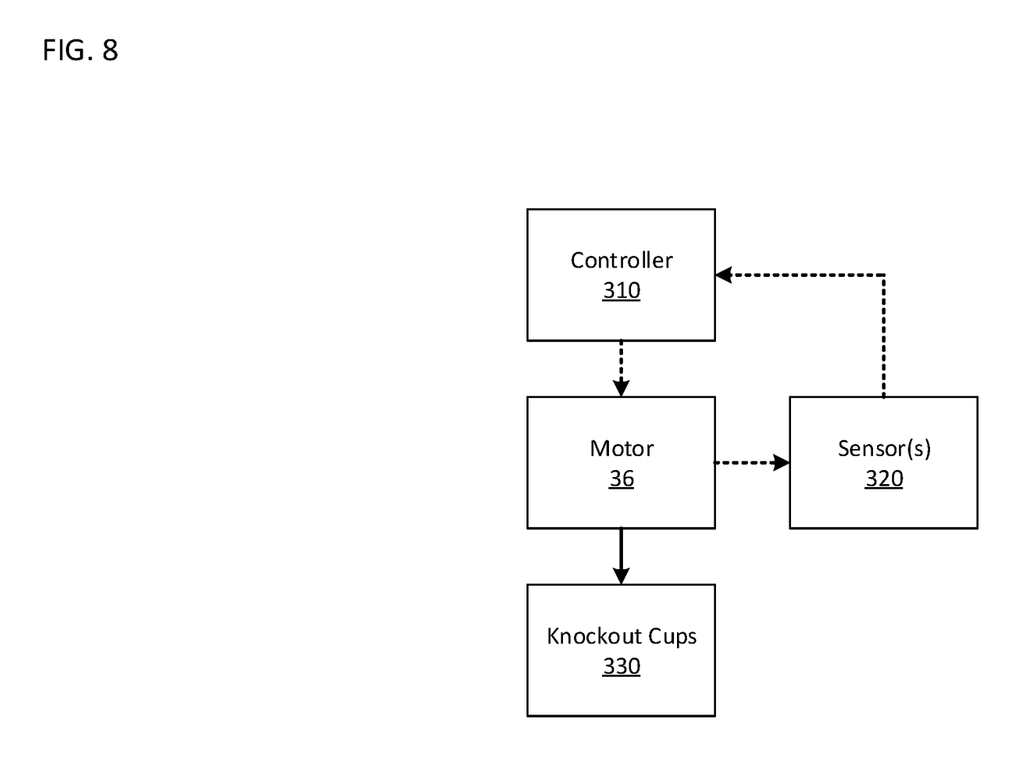
FIG. 8 is a diagram illustrating a control relationship according to an embodiment of the present disclosure

FIG. 1 is a perspective view illustrating a knockout assembly, without a cover, according to an embodiment of the present disclosure. FIG. 2 is an exploded view of the knockout assembly, without the cover, illustrated in FIG. 1. FIG. 3 is a first perspective view of the knockout assembly, with the cover, according to an embodiment of the present disclosure. FIG. 4 is a second perspective view of the knockout assembly, with the cover, according to an embodiment of the present disclosure. FIG. 5 is an exploded view of the knockout assembly, with the cover, illustrated in FIG. 3. FIG. 6 is a perspective view illustrating a coupling, according to an embodiment of the present disclosure. FIG. 7 is a perspective view illustrating a connecting arm assembly according to an embodiment of the present disclosure. FIG. 8 is a diagram illustrating a control relationship according to an embodiment of the present disclosure With reference to FIGS. 1-5, the knockout assembly 100 may include a housing 110 and a knockout system 120.

Referring to FIGS. 3-5, the housing 110 may include, for example, a mold base 1, a cover 38, a gasket mold cover 39, screws 40, a screw 41, screws 42, washers 43, a heater 44, washers 45, a heat shield 46, screws 47, a stop seal tube 48, an O-ring 49, a seal tube 50, screws 51, tubes 52, O-ring 53, an electrical gasket 54, a mold cover 55, screws 27, a check valve plate retainer 56, a check valve plate 57, a check valve 58, a gasket mold cover 59, a bar seal clamp 60, screws 61, and proximity switches 30.

Referring to FIGS. 1-2, the mold base 1 may support and/or connect to other components of the knockout assembly 100. For example, a portion of the mold base 1 may be provided with at least a portion of the knockout system 120 thereon. Referring to FIGS. 3-5, the cover 38 may cover the portion of the mold base 1 and the portion of the knockout system 120 provided on the portion of the mold base 1. The gasket mold cover 39 may seal the cover 38 to the portion of the mold base 1. Some of the screws 40, 41, 42 and the washers 43 may also be provided to secure the cover 38 to the portion of the mold base 1.

Referring to FIGS. 3-5, the housing 110 may also include the tubes 52 that are configured to contain electrical wires that are connected to electrical components of the knockout assembly 100. For example, the electrical components may include controllers, motors (e.g. a servo motor 36), heaters (e.g. heater 44), and sensors (e.g. proximity switch 30). The tubes 52 may be provided with, for example, the stop seal tube 48, the O-ring 49, the seal tube 50, and the screws 51 to connect and seal the tubes 52 to each other. The tubes 52 may connected and sealed to the mold base 1 by, for example, the screws 47 and the O-ring 53.

Referring to FIGS. 1-2, the knockout system 120 may include, for example, a spreader bar 2, nuts 3, U-cup seals 4, sleeve bearings 5, felt strips 6, tube shafts 7, O-rings 8, screws 9, shaft housings 10, shaft housing gaskets 11, shaft housing covers 12, washers 13, screws 14, adapters 15, screws 16, a washer 17, an axle 18, a shaft spacer 19, a connecting arm assembly 20, pull bars 21, blocks 22, a beam 23, washers 24, nuts 25, washers 26, washers 28, a crank arm 29, screws 31, washers 32, a gearbox mounting plate 33, screws 34, a gearbox 35, a servo motor 36, screws 37, and a coupling 65.

The servo motor 36 may be configured to cause an output shaft of the servo motor 36 to rotate. The output shaft of the servo motor 36 may be connected to a crank arm 29, via a gearbox 35, and thus the servo motor 36 may be configured to rotate the crank arm 29 around an axis 90. According to an embodiment, the gearbox 35 may be mounted to a gearbox mounting plate 33 by the screws 34, and the gearbox mounting plate 33 may be mounted to the mold base 1 by the washers 32 and the screws 31. An output shaft of the gearbox 35 may extend through a hole of the gearbox mounting plate 33 and be connected to a coupling 65. The coupling 65 may couple the output shaft of the gearbox 35 to the crank arm 29 (e.g. an interior surface of the crank arm 29). According to embodiments, the coupling 65 may be a keyless bushing. According to an embodiment, the output shaft of the gearbox 35 may be a smooth shaft, the interior surface of the crank arm 29 may be a smooth surface, and the coupling 65 may be a hydraulic keyless bushing that is expandable to connect the crank arm 29 to the gearbox 35.

For example, with reference to FIG. 6, the coupling 65 may include a flange 266 and a double-walled sleeve 267. The flange 266 may include a pressure setting screw that may be adjusted to adjust a pressure of a pressure medium (e.g. a hydraulic fluid) within the double-walled sleeve 267. The double-walled sleeve 267 may be expanded (or contracted) in an inner and outer radial direction due to an increase (or decrease) of the pressure of the pressure medium. Accordingly, a smooth outer surface 268 of the double-walled sleeve 267 may be expanded outward so as to firmly connect to the smooth interior surface of the crank arm 29, and a smooth inner surface 269 of the double-walled sleeve 267 may be expanded inward to firmly connect to the output shaft of the gearbox 35, that may also be smooth. In other words, the smooth surfaces may not include projections and/or depressions for securing together (e.g. not include keys and keyseats).

As described above, the coupling 65 may provide a smooth coupling, as opposed to a keyway coupling which may be destroyed by rapid rotational movement and starting and stopping of the servo motor 36 that may occur in knockout systems. Also, the coupling 65 may be easily assembled to and removed from the knockout assembly 100. According to an embodiment, the coupling 65 may be an ETP-Power® coupling.

Referring to FIG. 2, an outer side of the crank arm 29, that is radially offset from the axis 90, may be connected to one end of a connecting arm assembly 20, such that the one end of the connecting arm assembly 20 moves in vertical and horizontal directions due to the revolving motion of the outer side of the crank arm 29 around the axis 90. Another end of the connecting arm assembly 20 may be connected to a beam 23 by an axle 18, a shaft spacer 19, the washers 24, and the screws 16. The another end of the connecting arm assembly 20 may push and pull the beam 23 in the vertical direction based on the revolving motion of the one end of the crank arm 29. According to an embodiment, with reference to FIG. 2, the axle 18 may extend towards the beam 23.

The beam 23 may be connected to the pull bars 21 by nuts 25 and washers 26. The pull bars 21 may also be supported by blocks 22 that are connected to the beam 23 by the screws 27 and the washers 28. Upper ends of the pull bars 21 may be inserted through a respective one of the blocks 22. Lower ends of the pull bars 21 may be inserted through shaft housings 10, respectively, and the mold base 1, so as to protrude to an outside of the housing 110. The lower ends of the pull bars 21 may be connected to respective ends of the spreader bar 2, outside the housing 110. A tube shaft 7 may be provided around each of the pull bars 21, and through the shaft housings 10, such that an upper end of the tube shaft 7 contacts one of the blocks 22 and a lower end of the tube shaft 7 contacts the spreader bar 2. The blocks 22, the pull bars 21, each of the tube shaft 7, and the spreader bar 2 connected to the pull bars 21, may move upward and downward with the beam 23 when the beam 23 is pushed and pulled in the vertical direction by the connecting arm assembly 20. According to an embodiment, the pull bars 21, when moved upwards with the beam 23, may pull the spreader bar 2 upwards such that the spreader bar 2 pushes each of the tube shaft 7 upwards. Also, the blocks 22, when moved downwards by the beam 23, may push each of the tube shaft 7 downwards such that each of the tube shaft 7 assist in pushing the spreader bar 2 downwards. Accordingly, the servo motor 36 may cause the pull bars 21, each of the tube shaft 7, and the spreader bar 2 to repetitively move downward and upward with the beam 23 by rotating the shaft of the servo motor 36 in a single direction. The spreader bar 2 may be configured to be connected to knockout cups (e.g. knockout cups 330 of FIG. 8) for knocking out food product. Accordingly, the servo motor 36 may be configured to cause the knockout cups to each repetitively move downward and upward so as to knockout food product and return to a return position.

The shaft housings 10 may be fixed to the mold base 1 by screws 9, and may be connected to a shaft housing gasket 11 and a shaft housing cover 12, using washers 13 and screws 14. Felt strips 6, sleeve bearings 5, and U-cup seals 4 may be provided inside and below the shaft housings 10. The configurations of the shaft housings 10 may enable lubricant (e.g. grease) to be contained within the shaft housings 10 without spilling out onto the mold base 1 or onto food product. Each of the tube shaft 7, with the pull bars 21 therein, may be configured to slide through the shaft housings 10 and, more particularly, through the felt strips 6, the sleeve bearings 5, the U-cup seals 4, the shaft housing gaskets 11, the shaft housing cover 12, and an O-ring 8, provided within and/or adjacent to the shaft housings 10.

Referring to FIG. 7, the connecting arm assembly 20 may include, for example, a body 201 with bearings 203 therein. The connecting arm assembly 20 may further include covers 205 that are connected to the body 201 by screws 207 such that the covers 205 cover the bearings 203.

According to embodiments, the spreader bar 2 may have a thickness such as to avoid the spreader bar 2 from being damaged in a case where the knockout cups crash. According to embodiments, referring to FIG. 8, the knockout assembly 100 may further include a controller 310 and at least one sensor 320. The controller 310 may be configured to control the servo motor 36 based on inputs from the at least one sensor 320. The controller 310 may comprise at least one processor and memory storing computer program instructions that are configured to cause the controller to perform its functions when the computer program instructions are executed by the at least one processor. According to an embodiment, the at least one sensor 320 may include sensors that are configured to measure angular velocity or torque of the servo motor 36 or another rotational component of the knockout assembly 100. According to an embodiment, the controller 310 may determine that the knockout cups 330, which may be connected to the spreader bar 2 (refer to FIG. 2), are crashing based on the rotational velocity and/or torque of the servo motor 36 (or the another rotational component) that is sensed, and control the servo motor 36 to stop, reverse, or slow movement of the knockout cups 330 to avoid damaging the knockout system 120.

According to embodiments, knockout shafts may be provided. The knockout shafts may each be a single shaft, or formed of a plurality of coaxial shafts (e.g. the pull bar 21 and the tube shaft 7 as shown in FIG. 2). Although the above-described embodiments describe two knockout shafts, alternative embodiments may include differing numbers of knockout shafts. In some embodiments, the knockout shaft may be directly attached to a singular knockout cup or other tooling. Alternatively, the knockout shafts may attach to an intermediate crossbar (e.g. spreader bar 2) or other attachment means to which a plurality of knockout cups are attached. Additionally, the knockout cups (e.g. knockout cups 330) could be of a variety of shapes in order to form the desired foods.

According to embodiments, to perform a knockout operation, the knockout assembly 100 may be controlled by the controller 310 to move the knockout shafts down and up, in one cycle, in around 30-80 ms. According to embodiments, the knockout system 110, including the servo motor 36, may be configured to perform 120 cycles per minute.

While this specification contains many features, the features should not be construed as limitations on the scope of the disclosure or of the appended claims. The knockout assembly may be an integrated part of a food processing machine or separate. Embodiments of the disclosure may be replacement or bolt-on knockout assemblies for retrofitting on machines, such as the aforementioned hydraulic or cam driven machines.

The various components of the knockout assembly may be made from a variety of materials, not limited to metals, composites, or plastics. It is noted that various combinations of components of similar or differing materials may be used.

What is claimed is:

1. A food processing knockout assembly comprising:
a motor;
a crank arm connected to the motor and configured to be rotated by the motor, around an axis that passes through the crank arm;
a connecting arm connected to the crank arm and configured to move in a vertical direction in response to rotation of the crank arm;
a beam connected to the connecting arm and configured to move in the vertical direction in response to movement of the connecting arm in the vertical direction;
at least one knockout shaft connected to the beam, at one end of the at least one knockout shaft, and configured to move in the vertical direction in response to movement of the beam in the vertical direction;
a gearbox connected to the motor; and
a coupling that connects the crank arm to the gearbox,
wherein one end of the connecting arm is connected to the crank arm in a first direction that is perpendicular to an extending direction of the connecting arm, and another end of the connecting arm is connected to the beam via an axle that extends, towards the beam, through the connecting arm in the first direction,
wherein the coupling is a hydraulic keyless bushing that is coupled to a circumferential surface of the crank arm and a circumferential surface of the gearbox, and
wherein the hydraulic keyless bushing comprises a double-walled sleeve that comprises a hydraulic fluid, the double-walled sleeve configured to expand or contract based on a pressure of the hydraulic fluid.

2. The food processing knockout assembly according to claim 1, wherein the at least one knockout shaft is configured to repetitively move upward and downward, based on the motor generating rotational motion in a single rotational direction.

3. The food processing knockout assembly according to claim 1, wherein each of the at least one knockout shaft comprises a tube shaft and a pull bar, provided within the tube shaft.

4. The food processing knockout assembly according to claim 1, wherein the food processing knockout assembly further comprises a spreader bar that is connected to another end of the at least one knockout shaft.

5. The food processing knockout assembly according to claim 1, wherein the at least one knockout shaft is two knockout shafts that are attached to respective ends of the beam.

6. The food processing knockout assembly according to claim 1, further comprising:
a housing that houses the motor, the crank arm, the connecting arm, and the beam,
wherein another end of the at least one knockout shaft is configured to protrude out of the housing.

7. The food processing knockout assembly according to claim 6, wherein the housing comprises a base and a cover.

8. The food processing knockout assembly according to claim 1, wherein the motor is a rotary servo motor.

9. The food processing knockout assembly according to claim 1, wherein the connecting arm comprises:
a first bearing that surrounds a part of the crank arm that is connected to the connecting arm; and
a second bearing that surrounds the axle that connects the connecting arm to the beam.

10. The food processing knockout assembly according to claim 9, wherein the connecting arm further comprises:
a body that houses the first bearing and the second bearing;
a first cover that is configured to be fixed to the body such as to cover the first bearing in the body; and
a second cover that is configured to be fixed to the body such as to cover the second bearing in the body.

11. The food processing knockout assembly according to claim 10, wherein the second cover includes a through hole that is configured to receive the axle.

12. The food processing knockout assembly according to claim 1, wherein the another end of the connecting arm is directly connected to the beam via the axle that extends, towards the beam, through the connecting arm in the first direction.

* * * * *